United States Patent [19]

Petersen

[11] Patent Number: 5,129,781
[45] Date of Patent: Jul. 14, 1992

[54] APPARATUS FOR RECEIVING, STORING AND PROCESSING PRINTED PRODUCTS

[75] Inventor: Godber Petersen, Augsburg, Fed. Rep. of Germany

[73] Assignee: Man Roland Druckmaschinen AG, Offenbach am Main, Fed. Rep. of Germany

[21] Appl. No.: 329,798

[22] Filed: Mar. 28, 1989

[30] Foreign Application Priority Data

Apr. 2, 1988 [DE] Fed. Rep. of Germany ....... 3811287
Apr. 2, 1988 [DE] Fed. Rep. of Germany ....... 3811289
Apr. 2, 1988 [DE] Fed. Rep. of Germany ....... 3811290

[51] Int. Cl.$^5$ ..................... B65H 29/40; B65H 31/32
[52] U.S. Cl. ............................. 414/791.2; 414/788.3; 270/54
[58] Field of Search ............... 414/789.6, 791.2, 788.2, 414/788.3, 790.9; 270/54–58; 271/204, 206, 212, 213, 214, 218; 100/3, 7

[56] References Cited

U.S. PATENT DOCUMENTS

| | | | |
|---|---|---|---|
| 3,379,320 | 4/1968 | Loach et al. | 414/788.3 |
| 3,448,870 | 6/1969 | Gallo . | |
| 3,450,275 | 6/1969 | Carlén | 414/788.3 |
| 3,477,591 | 11/1969 | Anderson | 414/788.3 |
| 3,488,693 | 1/1970 | Brinkmeier | 414/788.3 |
| 3,532,230 | 10/1970 | Gutberlet | 414/788.3 |
| 3,599,807 | 8/1971 | Hedrick | 414/788.3 |
| 3,704,883 | 12/1972 | Don | 414/789.6 X |
| 4,060,231 | 11/1977 | Stobb et al. | 414/788.3 X |
| 4,065,117 | 12/1977 | Thorsheim | 270/58 |
| 4,124,128 | 11/1978 | Adams et al. | 414/788.3 |
| 4,162,733 | 7/1979 | Wiseman | 414/788.3 X |
| 4,183,704 | 1/1980 | Steinhart | 414/788.3 X |
| 4,191,499 | 3/1980 | Futer . | |
| 4,219,120 | 8/1980 | Rysti | 414/789.6 X |
| 4,265,582 | 5/1981 | Theobald . | |
| 4,307,800 | 12/1981 | Joa | 414/788.3 X |
| 4,344,727 | 8/1982 | Chaloupka . | |
| 4,364,702 | 12/1982 | Coussot | 414/788.3 |
| 4,457,656 | 7/1984 | Kosina et al. | 414/788.3 |
| 4,547,112 | 10/1985 | Steinhart | 414/788.3 |
| 4,623,291 | 11/1986 | Buck | 414/788.3 |
| 4,657,465 | 4/1987 | Aoki | 414/788.3 |
| 4,678,387 | 7/1987 | Sjogren et al. | 414/788.3 X |
| 4,721,296 | 1/1988 | Mowry | 270/55 |
| 4,784,558 | 11/1988 | Toriyama | 414/788.3 |
| 4,828,242 | 5/1989 | Kobler . | |
| 4,840,365 | 6/1989 | Kobler et al. | 270/54 |
| 4,871,159 | 10/1989 | Petersen | 270/55 |

FOREIGN PATENT DOCUMENTS 257470 10/1967 Austria .

(List continued on next page.)

OTHER PUBLICATIONS

Article by Heptner in "fördern und heben 19" (1969) No. 12, pp. 727-732, entitled "Methods of Goods Distribution and Order Filling in the United States".

*Primary Examiner*—Robert J. Spar
*Assistant Examiner*—Brian Dinicola
*Attorney, Agent, or Firm*—Frishauf, Holtz, Goodman & Woodward

[57] ABSTRACT

To transport, store, process and handle and distribute a plurality of printed products, retained in cassettes on a minimum of space, the cassettes are vertically stored, preferably in pairs. Transport can occur in a predetermined plane, of full and empty cassettes, respectively, the cassettes being moved within the storage elements by horizontal and vertical or lift transport elements, so that the cassettes can be moved in all directions of the three-dimensional storage structures and removed from any one position. The cassettes can be loaded on carts or carriages and coupled together to be moved in form of trains by a drive head (28) past product delivery stations, such as folding apparatus (9, 13) coupled to printing machine units (1-8), for placement in the storage racks; and removed from the cassettes, collected in groups in pivotable holders (116-119), with two, each; holders facing each other and pivoting towards each other so that the groups of products in the holders will be cross-positioned on the delivery or removal apparatus, for example a transport belt (124).

6 Claims, 14 Drawing Sheets

FOREIGN PATENT DOCUMENTS

| | | |
|---|---|---|
| 365537 | 1/1982 | Austria . |
| 272543 | 6/1988 | European Pat. Off. . |
| 2027906 | 1/1971 | Fed. Rep. of Germany . |
| 2113202 | 10/1972 | Fed. Rep. of Germany . |
| 2120842 | 11/1972 | Fed. Rep. of Germany . |
| 2215252 | 10/1973 | Fed. Rep. of Germany . |
| 2437475 | 5/1975 | Fed. Rep. of Germany . |
| 2639427 | 3/1978 | Fed. Rep. of Germany . |
| 2828144 | 2/1979 | Fed. Rep. of Germany . |
| 3615880 | 11/1987 | Fed. Rep. of Germany . |
| 0250772 | 1/1988 | Fed. Rep. of Germany . |
| 3644423 | 7/1988 | Fed. Rep. of Germany . |
| 0336177 | 10/1989 | Fed. Rep. of Germany . |
| 2249009 | 5/1975 | France . |
| 2521965 | 8/1983 | France . |
| 2562522 | 10/1985 | France ............... 414/789.6 |
| 86547 | 12/1971 | German Democratic Rep. . |
| 150183 | 9/1981 | German Democratic Rep. . |
| 15351 | 1/1985 | Japan ............... 414/788.3 |
| 110472 | 4/1989 | Japan ............... 414/788.3 |
| 425635 | 6/1967 | Switzerland . |
| WO88/00921 | 2/1988 | World Int. Prop. O. . |

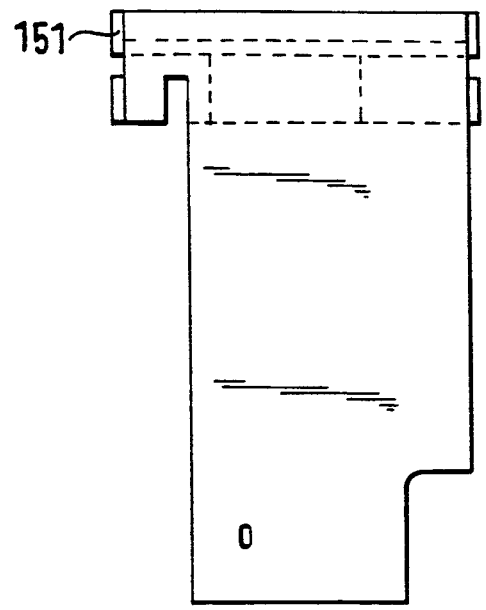
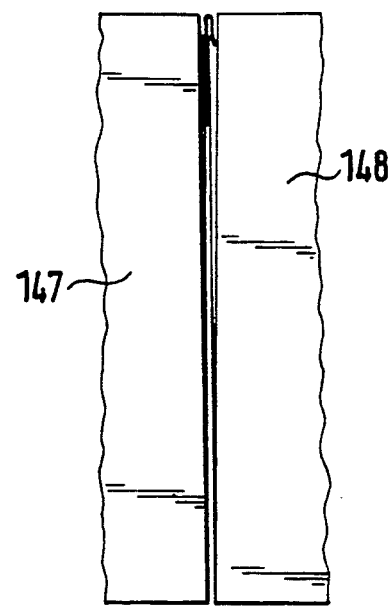
FIG.15     FIG.16
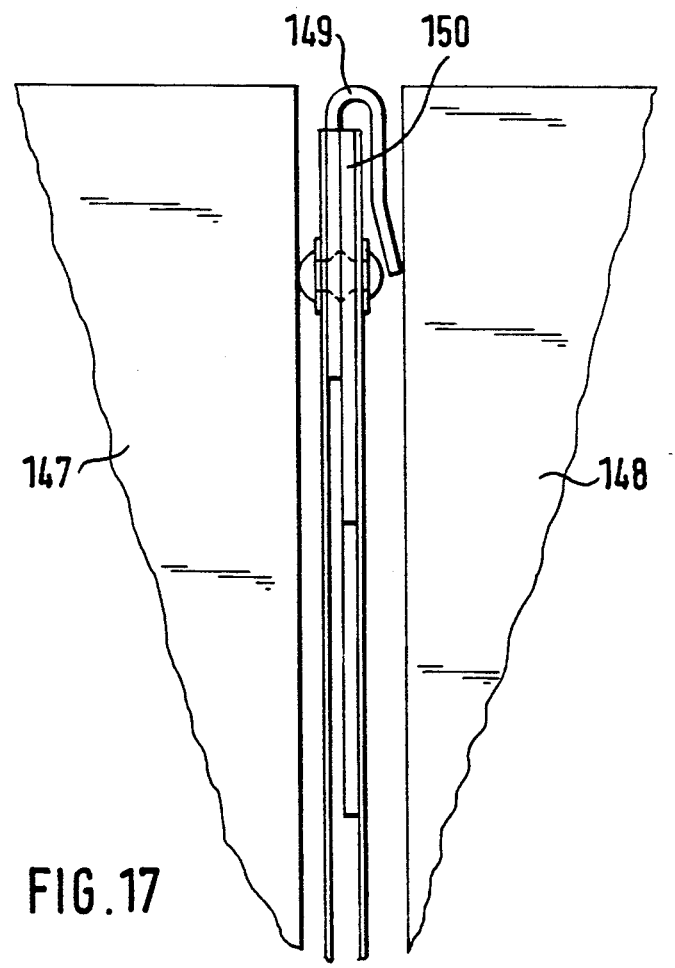
FIG.17

APPARATUS FOR RECEIVING, STORING AND PROCESSING PRINTED PRODUCTS

Reference to related patents, assigned to the assignee of the present application:

U.S. Pat. No. 4,775,136, PETERSEN based on application Ser. No. 07/056,787, filed May 29, 1987,
U.S. Pat. No. 4,871,159, PETERSEN based on application Ser. No. 07/137,343, filed Dec. 23, 1987,
U.S. Pat. No. 4,840,365, KOBLER based on application Ser. No. 07/056,786, filed May 29, 1987.

FIELD OF THE INVENTION

The present invention relates to apparatus ancillary to printing machinery, and more particularly to apparatus for receiving, storing, handling and/or processing printed products.

BACKGROUND

Printed products, and especially products derived from printing machines which print newspapers, magazines and the like, are frequently transported away from the printing machine by various types of transport arrangements such as transport chains, belts and, when bundled, with dolleys or carts which may follow certain guide tracks, either on predetermined rails or under control of a program track control system. The printed products, when so transported, must be frequently handled by loading and re-loading, for example from one transport apparatus or element to another one. Storing of printed products, particularly if their number is large, causes difficulties and is space-consuming. Additionally, access to specific printed products frequently is difficult due to space and apparatus and equipment constraints. Problems in connection with handling of the printed products are particularly severe if the transport apparatus operates in a single plane. Transport chains or belts which transport printed products in an imbricated stream have a finite length. Fully automatic handling of printed products with systems of this type is achieved only with great difficulty, if at all.

THE INVENTION

It is an object of the present invention to provide an apparatus and system to receive or accept printed products, for example from printing machinery stations, handle and process the printed products, and transport them, store them, and deliver them, as desired, and which permits fully automatic or at least semi-automatic handling and transporting, and in which the space and especially the ground surface required is substantially reduced with respect to prior art systems and installations.

Briefly, a product storage structure is provided which has a plurality of essentially parallel, substantially horizontal storage levels, which, at least one some and preferably on all of the levels, have a plurality of storage locations. A plurality of product storage cassettes, each equipped to have a plurality of product receiving structures, preferably in accordion or zig-zag form, are positionable on selected storage locations. The storage locations are characterized by coded storage fields, so that specific cassettes in a specific storage location can be addressed. A horizontal transport arrangement transports or moves cassettes on the respective levels to shift them where desired, and for example to an empty position where they can then, by a vertical transport or elevator or lifting arrangement, be transported to a level from which they can be further transported to, for example, a delivery station or from where filled cassettes, received from a printing machine, can be re-stored in the storage structure.

In accordance with a preferred feature of the invention, a plurality of transport ways are provided, for example located in vertically staggered planes, and passing at least one of the printed product supply stations, for example folding former stations downstream of the printing machinery. The transport ways retain a plurality of product receivers to receive the cassettes, independently controllable on the transport ways and preferably arranged to be hooked together to form a transport train. The printed product receivers are moved along the transport ways in a predetermined plane to a receiving position adjacent a printed product supply station and from the receiving station to a storage position, for example the printed product storage structure. Preferably, the product receiving means, that is the cassettes, are moved along the transport ways by a drive unit, which can pull a plurality of cassettes along the transport ways.

In accordance with another feature of the invention, the printed products can be stacked, ready to be bundled, by gripping a plurality of printed products in a given alignment, for example at a folded edge, and placing them on a delivery apparatus, such as a transport belt, in a first group. A second group of printed products, likewise, is gripped by a gripper parallel to and adjacent the first one. Preferably, the grippers are fork-like. By alternately flipping the grippers on the transport belts, the groups of products will be placed above each other, with the predetermined edges, for example the folded edges, of the printed products of the respective groups being angled with respect to each other, for example placed crosswise or 180° offset, so that the stack will remain essentially vertical and not have a tendency to slide or tilt over. A plurality of groups of products can be assembled together, for subsequent wrapping or bundling and transport to further delivery, for example a loading platform for delivery vehicles.

The overall system, thus, has the advantage that it can be operated essentially automatically, and handle printed products in accordance with coded information which can be carried on the products themselves, the sequencing of operation being readily controllable by well known timing and sequencing systems, so that the printed products can be moved rapidly and efficiently from a supply position, for example the output of a printing machine and associated apparatus, to a delivery position, for example a loading platform for further distribution of the printed products.

DRAWINGS

In which all representations are schematic and features not necessary for an understanding of the present invention have been omitted:

FIG. 15 is a front view of a zig-zag carrier structure, capable of being coupled to another one;

FIG. 16 is a side view of two storage structures coupled together; and

FIG. 17 is an enlarged view illustrating a coupling arrangement.

DETAILED DESCRIPTION

Figure 1:
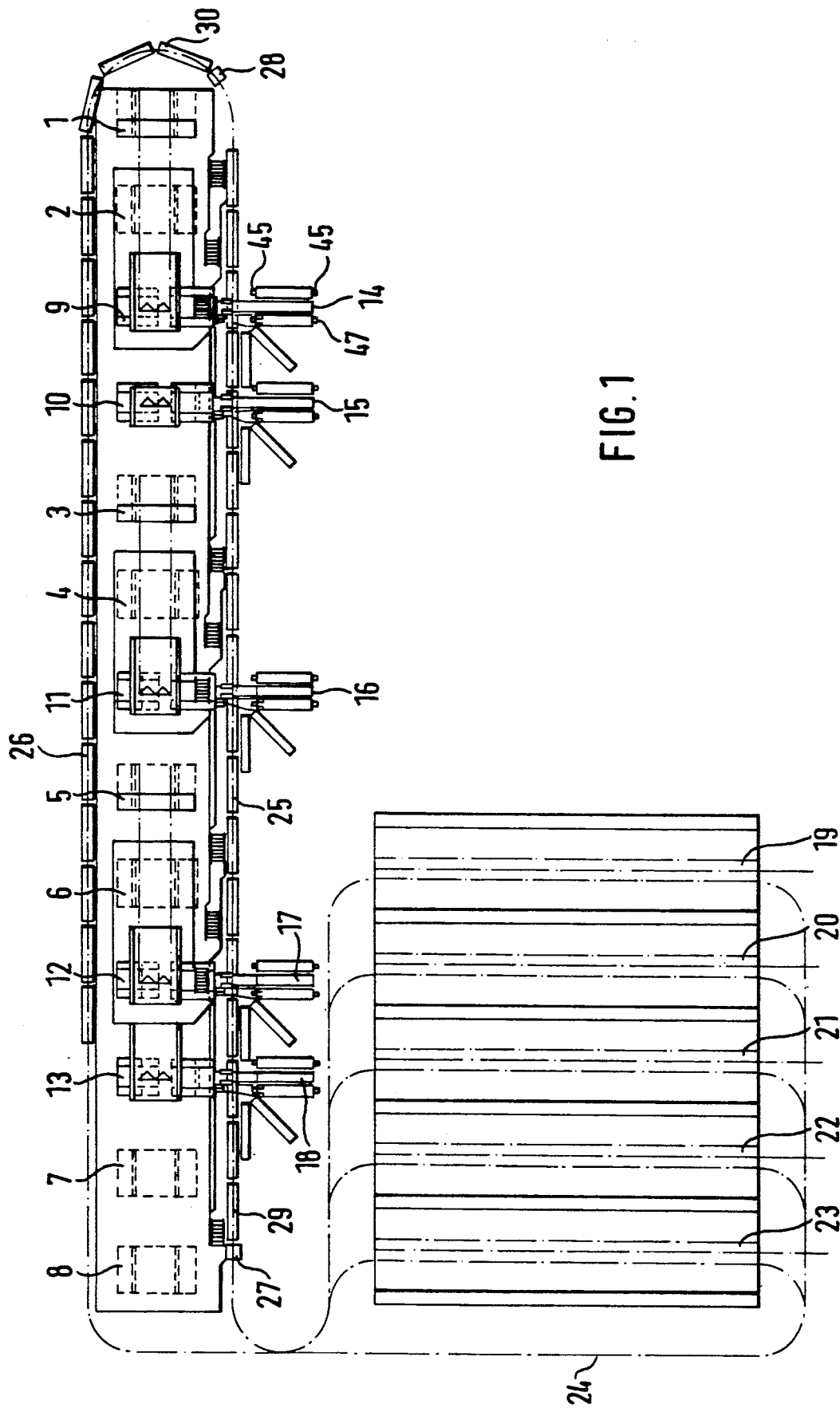
FIG. 1 is a top view of apparatus to receive, transport and move to storage location of printed products positioned adjacent or close to printing machinery.

The system and apparatus of the present invention is shown in FIG. 1 in combination with a printing machine which has printing stations 1, 2, 3, 4, 5, 6, 7, 8. Each one of the printing stations 1 to 8 includes the customary printing machine and a folding apparatus which, in the example shown, is a double-fold unit 9, 10, 11, 12, 13, each folding unit taking the output from two printing machines. The output of the folding apparatus units 9-13 is supplied to respective loading stations 14, 15, 16, 17, 18. The loading stations provide for loading the printed products to one of the storage and handling stations 19, 20, 21, 22, 23. To transfer the printed products from the loading stations 14-18 to the handling stations or processing stations 19-23, transport paths are provided, preferably located in various superposed planes. FIG. 1 shows one of the transport paths or transport ways 24. The respective printing machine stations 1-8 or, respectively, the double-fold units 9-13, are thus coupled to the storage and processing stations 19-23 by the transport ways. Each one of the transport ways, for example the transport way 24, has two transport trains 25, 26 thereon which, each, are formed by a driving head or locomotive unit 27, 28 and attached carts or carriages 29, 30, to service each of the double folding apparatus units 9-13.

In the example described, printed products are transported from the printing machine, or its printing units 1-8, respectively, to the processing stations 9-23 over ten transport paths or ways.

Figure 2:
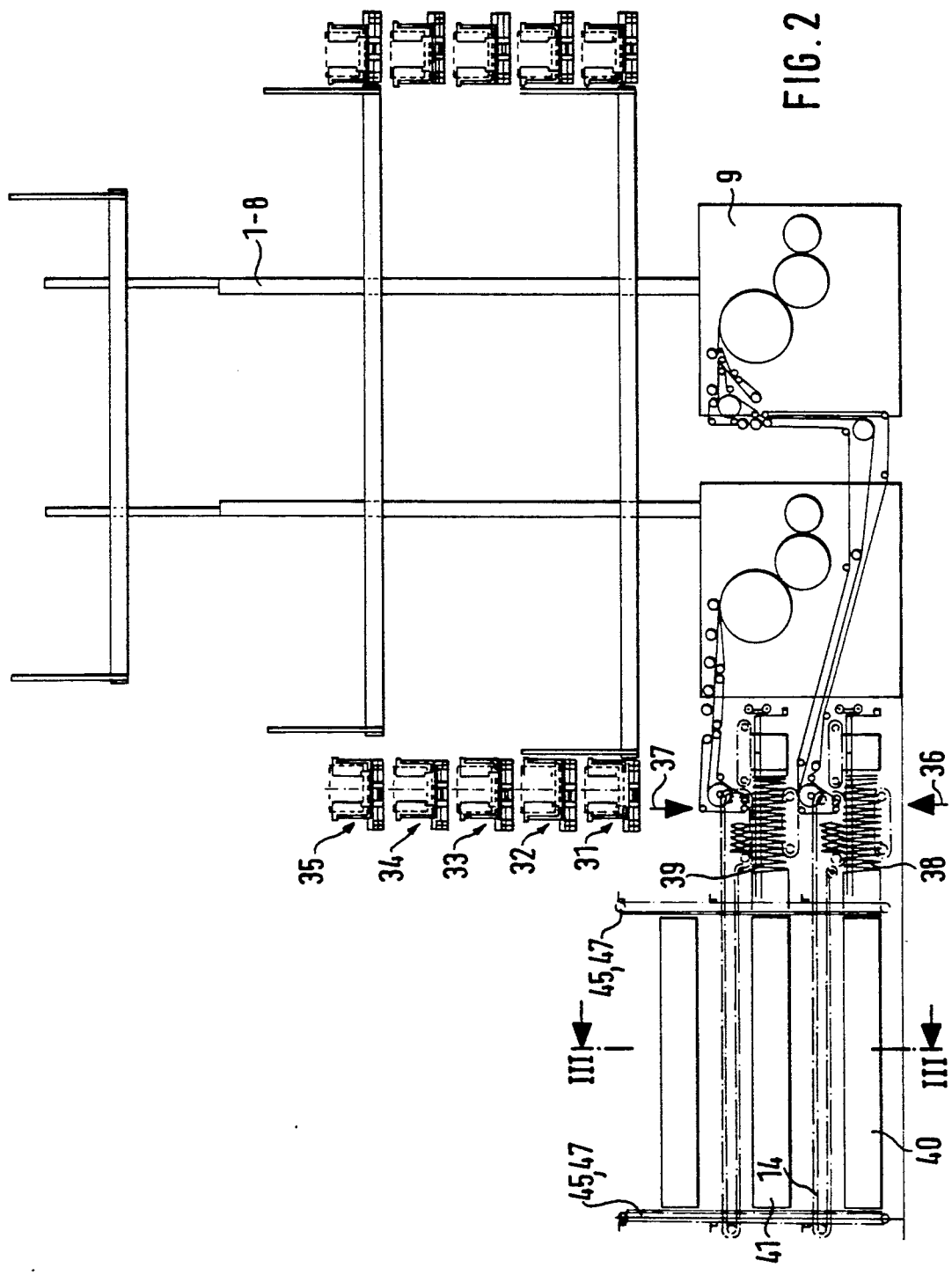
FIG. 2 is a side view of a loading station associated with a printing machine folding apparatus.

As best seen in FIG. 2, two trains 25, 26 (FIG. 1) operate in one plane, for example the plane 31. Each one of the transport planes 31-35 has two such trains operating therein. Newly arriving printed products, derived from the double folding apparatus units 9, are thereby transported to the storage and paper processing station 23. One of the trains, for example train 25 (FIG. 1) is being loaded; at the same time, the other one of the trains, for example train 26, can be unloaded in the associated storage station or storage region, for example station 23; or, if already unloaded, can be moved, while empty, in a holding position as shown in FIG. 1. The respective positions of the trains, by themselves, on the transport ways will depend on the distances between the printing machine and the paper processing station and/or the storage station. If the distance is long, more than two trains per transport way can be used.

Figure 3:
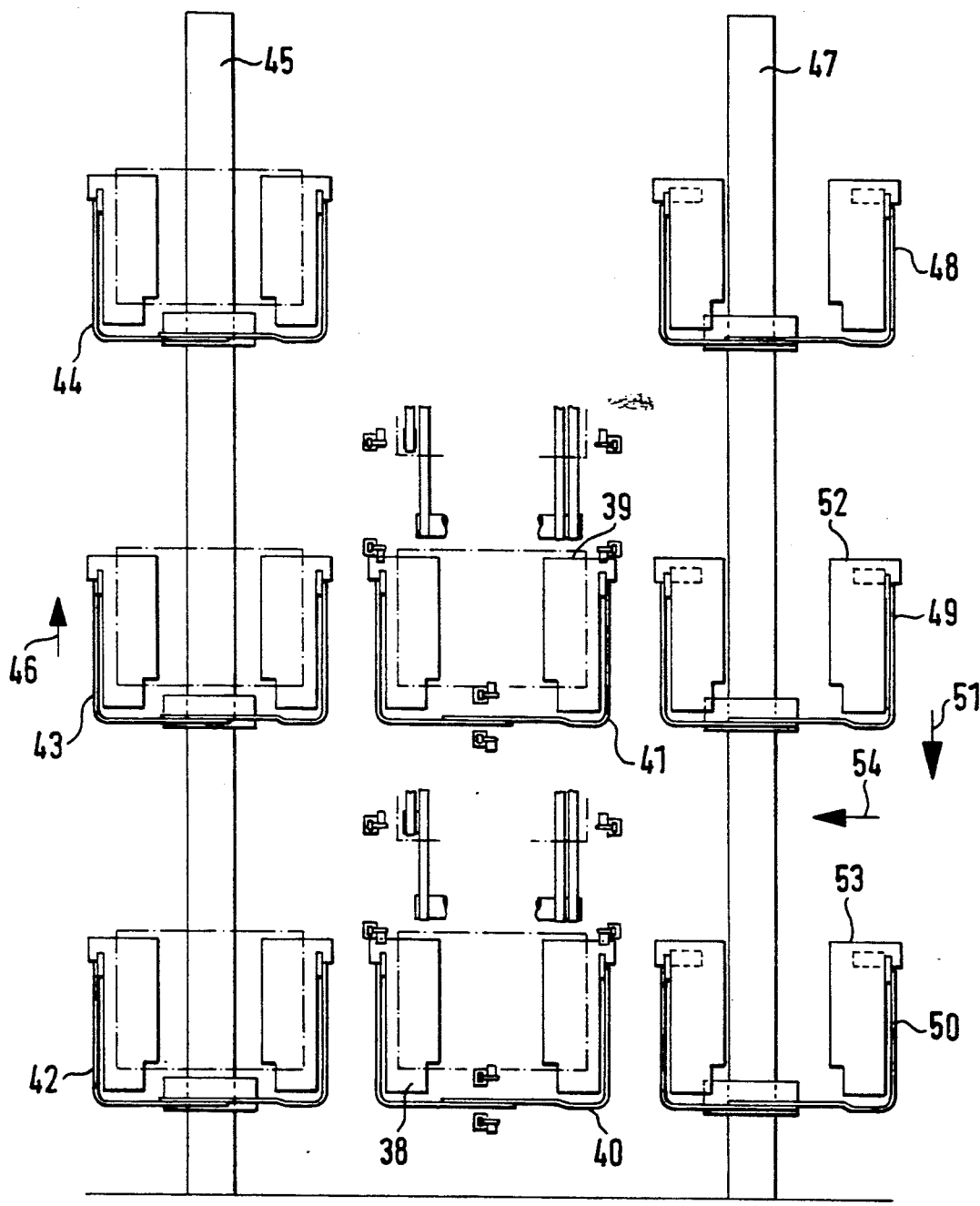
FIG. 3 is a schematic illustration illustrating supply and removal of storage cassettes to be loaded with printed products.

The storage structures themselves, on which the printed products are stored, are best seen in FIG. 2, and include expandable and collapsible zig-zag formed storage structures 38, 39, to be loaded with the double folding apparatus 9. The loading of the storage structures is described in the referenced Patent Petersen, based on U.S. application Ser. No. 07/056,787, of May 29, 1987 now U.S. Pat. No. 4,775,136 and in U.S. Pat. No. 4,840,365 Kobler et al, Ser. No. 07/056,786, filed May 29, 1987. Cassettes 40, 41, each holding a plurality of the storage structures 38, 39, are loaded at the respective folding units or stations 9. FIG. 3 is a schematic cross-sectional view along line III—III of FIG. 2 and illustrates transport of full cassettes 42, 43, 44 by vertical lifts or elevators 45 upwardly in the direction of the arrow 46. At the same time, a lift or elevator 47 supplies empty cassettes 48, 49, 50 in the direction of the arrow 51. To load the cassettes, empty zig-zag storage structures 52, 53 are taken out of the respective cassettes and the empty cassettes, for example cassettes 49, 50, are transported in the direction of the arrow 54 in order to take up the positions of the full cassettes 40, 41 after they are filled. As best seen in FIG. 2, the lifts 45, 47 move the cassettes from or to the plane or level 31. The respective lifts or elevators for the other planes 32 to 35 are extended to reach the respective supply level. From the respective supply plane 31—35, cassettes are turned in the direction of the transport plane, as indicated in FIG. 1, by a suitable turntable or other apparatus, well known. The track or way, for example the transport way 24, FIG. 1, will exchange empty and full cassettes, for example by removing an empty cassette and replacing it by a full cassette; the train can then shift by one car or carriage length to the next position. Each train, on any plane, can thus operate in block positioning operation, well known from railway technology, and independently controlled. This is readily possible by forming the transport ways with track portions, subdivided into blocks, and electrically insulated from each other, so that the respective blocks can be separately energized from an electrical power network. Various types of control technologies may be used, as well known in railway control technology, for example by use of different frequencies, in order to obtain individual control of the trains, and individual control at the respective levels. The only requirement is that control of any one train on one level may not interfere with control of trains on another level.

Figure 4:
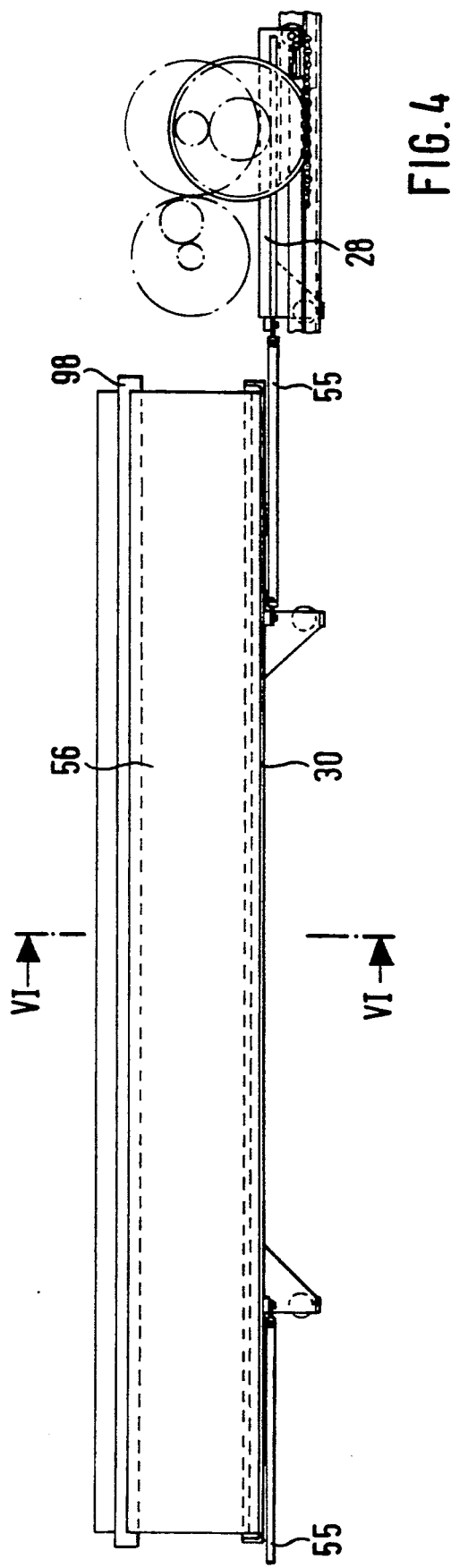
FIG. 4 is a schematic side view of a pulling, driving or locomotive head and a cart to receive and transport printed products.
Figure 5:
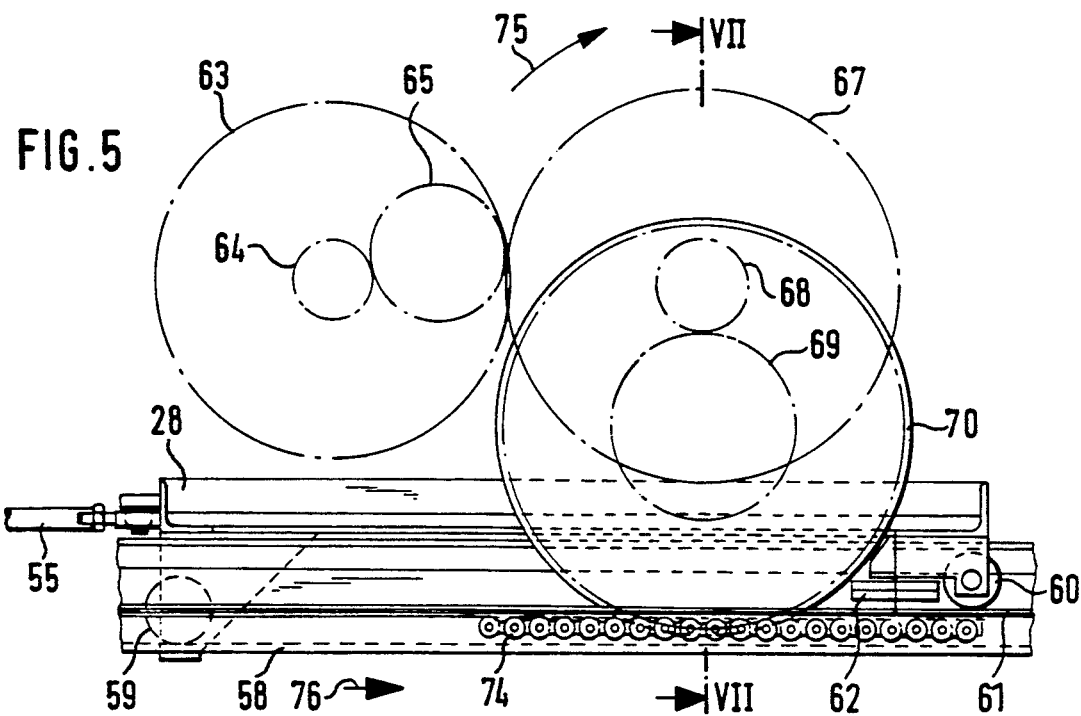
FIG. 5 is an enlarged view of the driving head of FIG. 4.
Figure 6:
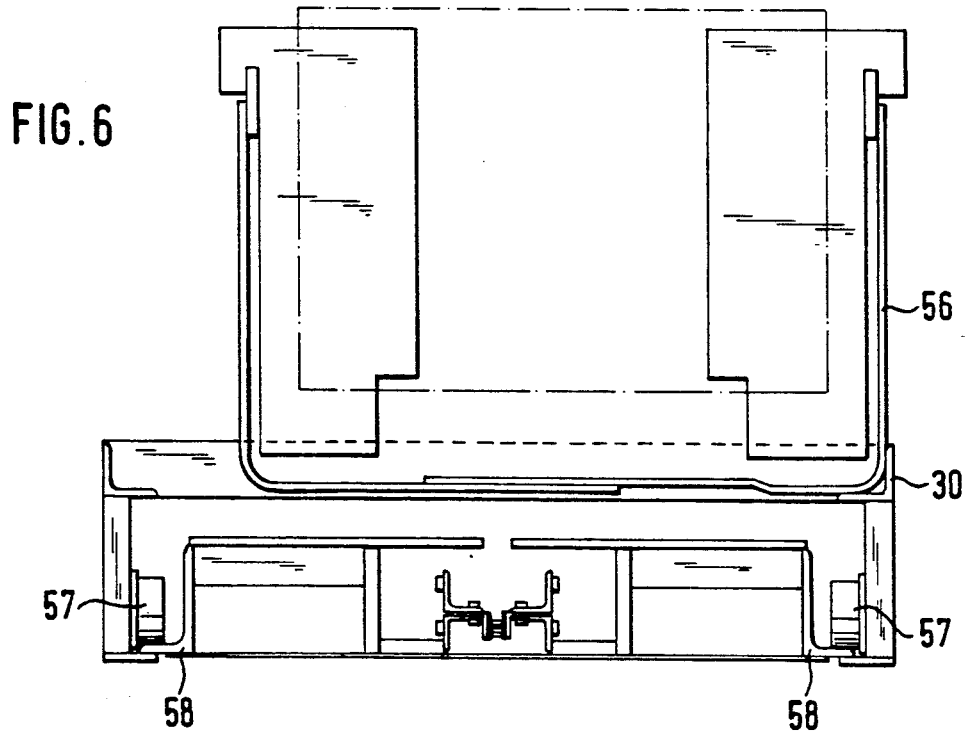
FIG. 6 is a cross-sectional view through a part on which a cassette is loaded.
Figure 7:
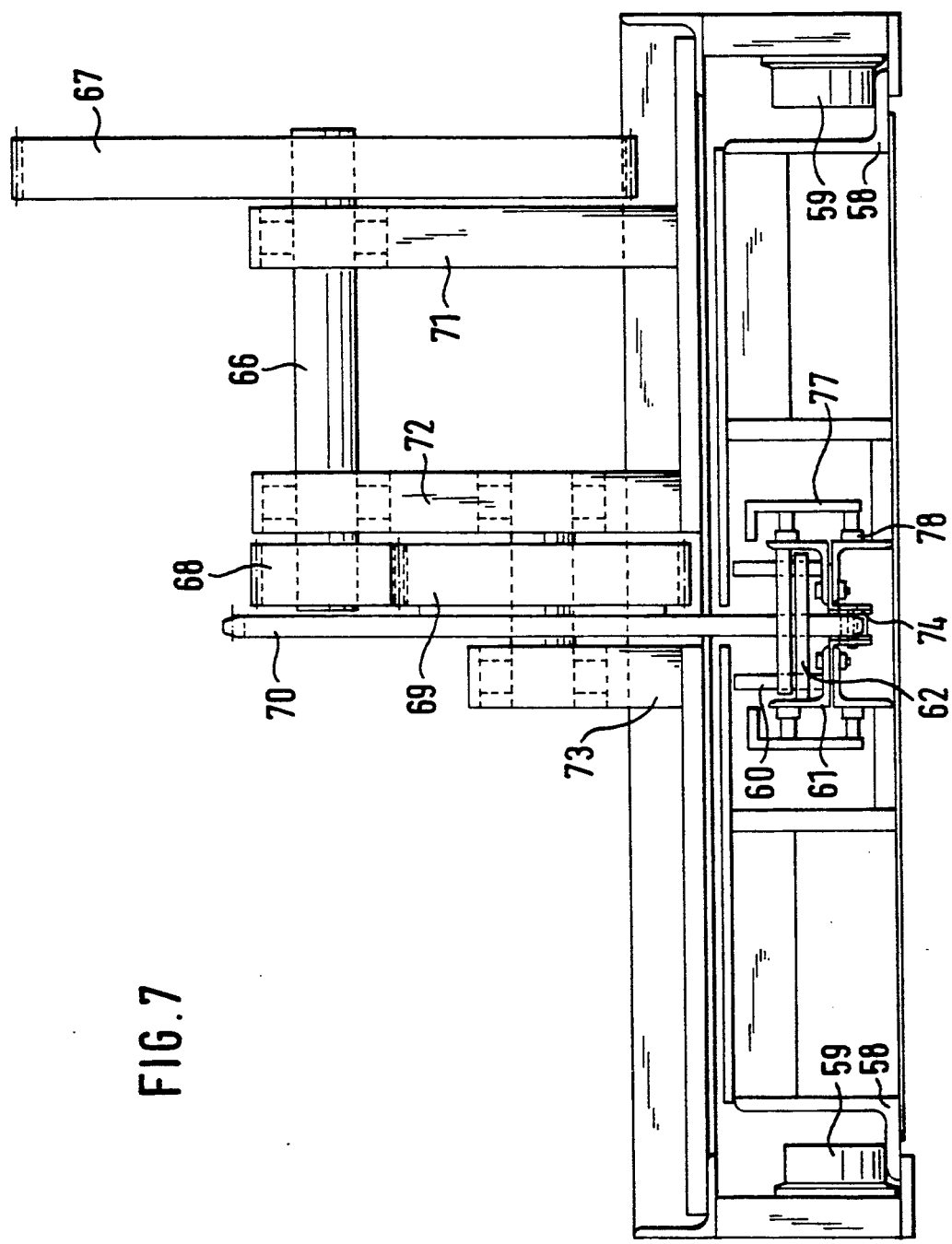
FIG. 7 is a section through the driving head of FIG. 5, along line VII—VII.

A suitable transport train to remove printed products from the folding stations, for example folding station 9, and transport them for further processing or handling, is shown in FIGS. 4 to 7. FIG. 4 illustrates a car or carriage 30, capable of receiving one or more cassettes. It is coupled by a flexible linkage 55 with a driving head or locomotive head 28. Full or empty cassettes, respectively, shown schematically at 56 can be positioned on the cart or car. The schematic showing of cassette 56 is representative of the cassettes 42, 43, 44 or 48, 49, 50, respectively. The carts 30 have rollers 57 which run on rails 58, as best seen in FIG. 6. FIG. 6 is a cross section along line VI—VI of FIG. 4; FIG. 7 is a cross section along line VII—VII of FIG. 5, in which FIG. 5 is an enlarged fragmentary representation of the drive head 28.

The drive or locomotive head 28 has rollers 59 which run on the rails 58; it also has rollers 60 which run on rails 61, see FIG. 7. Guide rollers 62 provide for lateral guidance on the rollers 61. The locomotive head, preferably, includes an electric motor 63 which is coupled over a pinion 64 and a wheel 65 to a drive gear 67. Gear 67 is coupled to a pinion 68 which, in turn, is coupled to a gear 69, which is securely coupled to a sprocket wheel 70. Shaft 66 and sprocket wheel 70 are journalled in bearing blocks 71, 72, 73 (see FIG. 7).

A roller chain 74 (FIGS. 5, 7) is securely coupled to the rails 61. Upon rotation of the motor 63, and hence of sprocket wheel 70, wheel 70 will engage in the chain 74, and drive the drive head 27, 28, respectively, of the associated train in the direction of a respective arrow 76.

The electric motor 63 is energized from a current pick-up 77 in sliding engagement with a current supply rail system 78. The pick-up, preferably, can be a unit having longitudinally staggered pick-up elements, or be fork-shaped, to provide for continuous current supply throughout longitudinal blocks, so that transport of the train between separately energized and separately controlled blocks is smoothly and easily possible.

The arrangement described can cover substantial distances, and any distances required, and also can cover grades. The roller chain 77, preferably, is constructed in form of a side roll chain which is somewhat flexible so that it can be bent in its plane over bending radii, and so that it can be positioned also around curves. The slide current supply system 78 is constructed, as known, in respectively insulated blocks or portions, separately electrically controlled and energized. Control of trains and drive units, independently of each other in the respective blocks, is then readily possible.

The printed products are held in the storage structures 38, 39, in highly compressed form, as described in the referenced U.S. Pat. No. 4,775,136, Petersen, based on application Ser. No. 07/056,787, of May 29, 1987. The compressed storage of the printed products, thus, permits high density of transported products and, due to the compressed position in the cassettes, permits high speed of the trains and hence high transport speeds and transport effectiveness, even over comparatively long distances.

Figure 8:
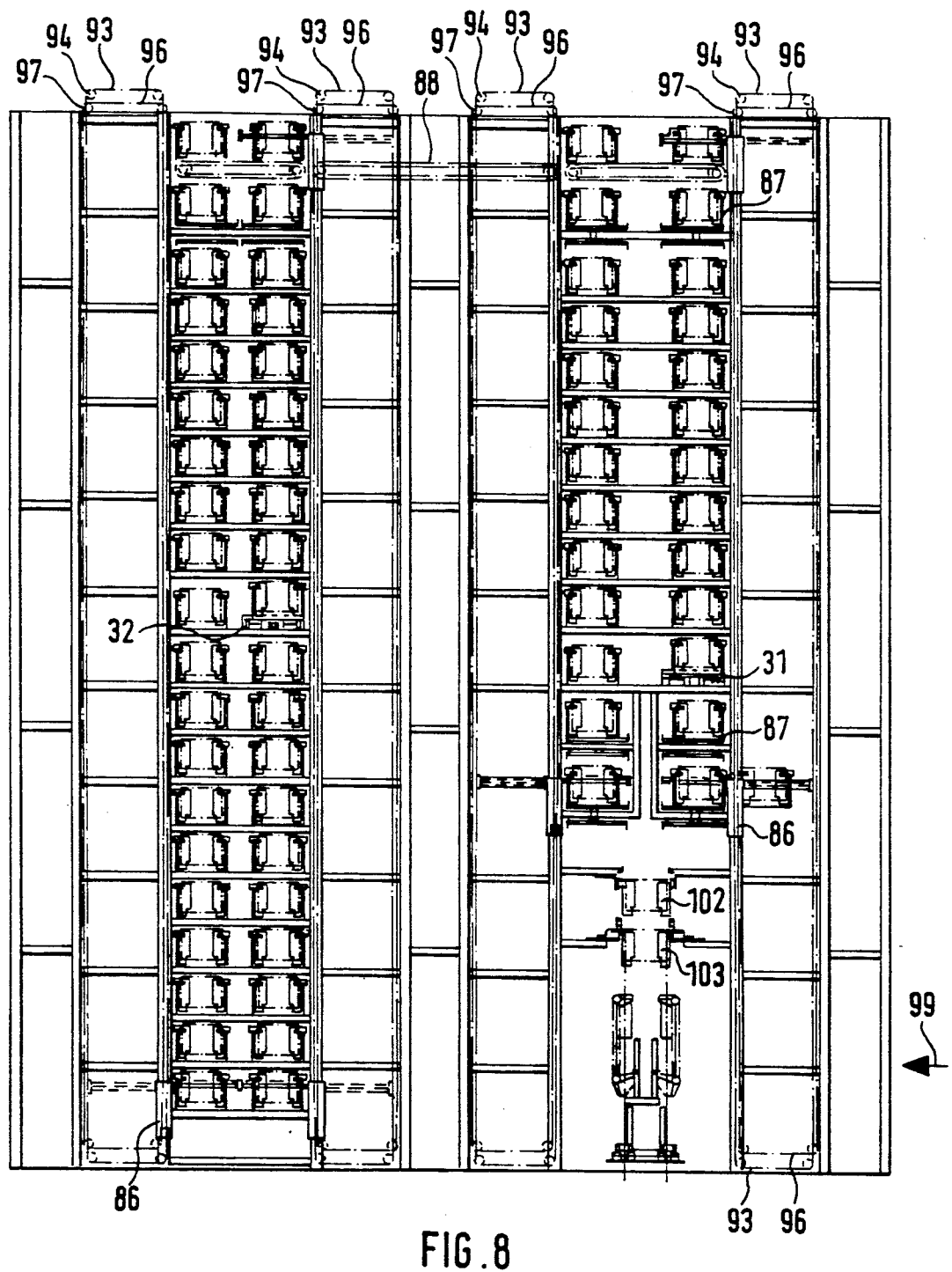
FIG. 8 is a front view of a storage structure to receive a plurality of printed products, themselves stored in cassettes.
Figure 9:
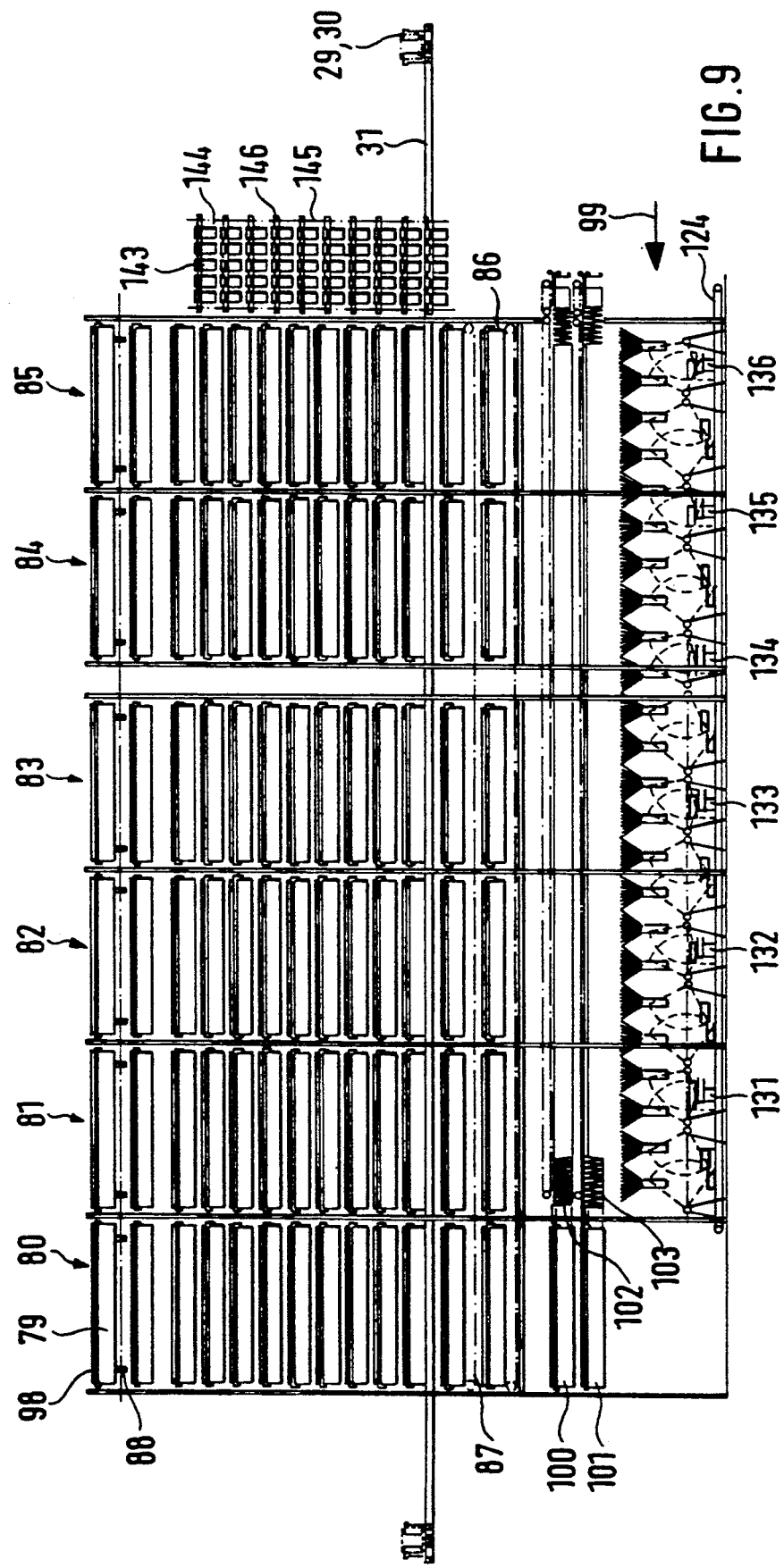
FIG. 9 is a side view of the structure of FIG. 8.

In accordance with a feature of the invention, the printed products can be stored and processed in a minimum of ground space by using storage and processing apparatus as shown in greater detail in FIGS. 8 and 9. Level 31, again, is shown in FIGS. 8 and 9 over which the trains 25, 26 can reach the storage structure shown specifically in FIGS. 8 and 9, and can arrive and depart therefrom. Further, a plane 32 for adjacent trains is shown in FIG. 8. Cassettes, shown schematically at 79 in FIG. 9, which are loaded or empty as the case may be, are placed at storage positions 80 to 85. The storage positions 80 to 85 are characterized by storage codes, so that the status of products or cassettes thereon can be electronically determined. The cassettes 79, preferably, also carry codes which can be read by code readers placed on the apparatus. Each one of the stations or storage fields 80 to 85 can receive a pair of cassettes adjacent each other, as best seen in FIG. 8. This is a particularly advantageous arrangement because suitable transport or lift elements 86 can be used to reach any one cassette. The lift arrangements 86 are provided for each one of the fields 80 to 85 in pairs. They can operate independently of each other, upwardly or downwardly, sequentially or simultaneously, so that, as desired, cassettes may be received or dropped by the lift elements. If all the lifts are moved at the same time, a transport train can be easily assembled, for example on the plane 31, at once, by all the respective lifts 86, in accordance with presence of the cassettes at the storage locations or fields 80 to 85. Thus, six storage locations can be loaded or unloaded at once.

Full cassettes being supplied to the storage structure shown in FIGS. 8 and 9 can be placed, in one movement, on transport belts 87 which, then, carry out distribution in horizontal direction. The belts 87 operate in a horizontal plane and shift the cassettes between the fields 80 to 85, see FIG. 9. Of course, it makes no difference if the cassettes are empty or full; thus, empty cassettes can be provided for an entire train length on the transport belts 87 and then coupled to a driving head to form a train, for loading simultaneously.

FIG. 8 further illustrates a transport belt system 88 which permits exchange of cassettes between the paired stacks.

Figure 10:
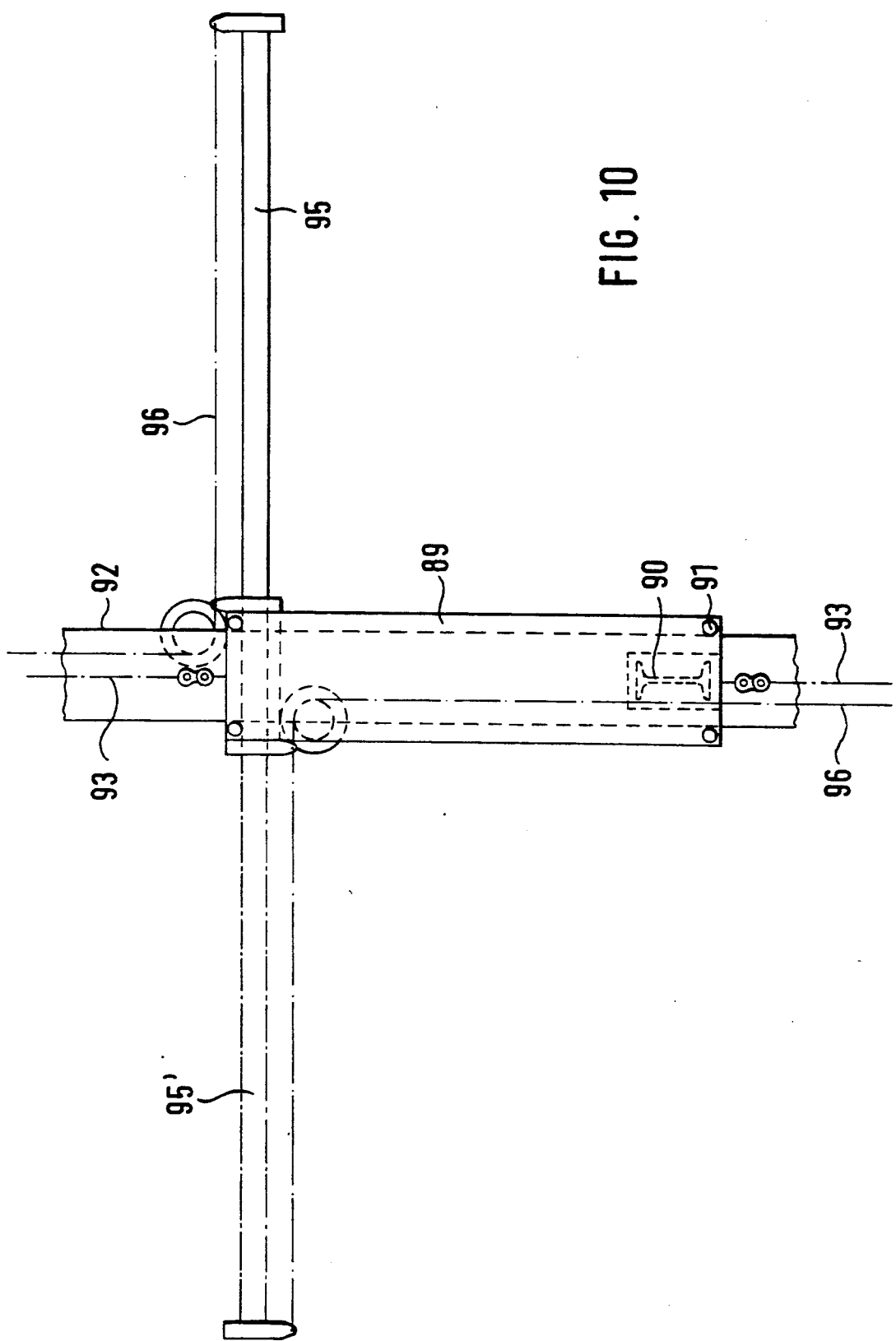
FIG. 10 is a front view of a portion of the storage structure of FIGS. 8 and 9.
Figure 11:
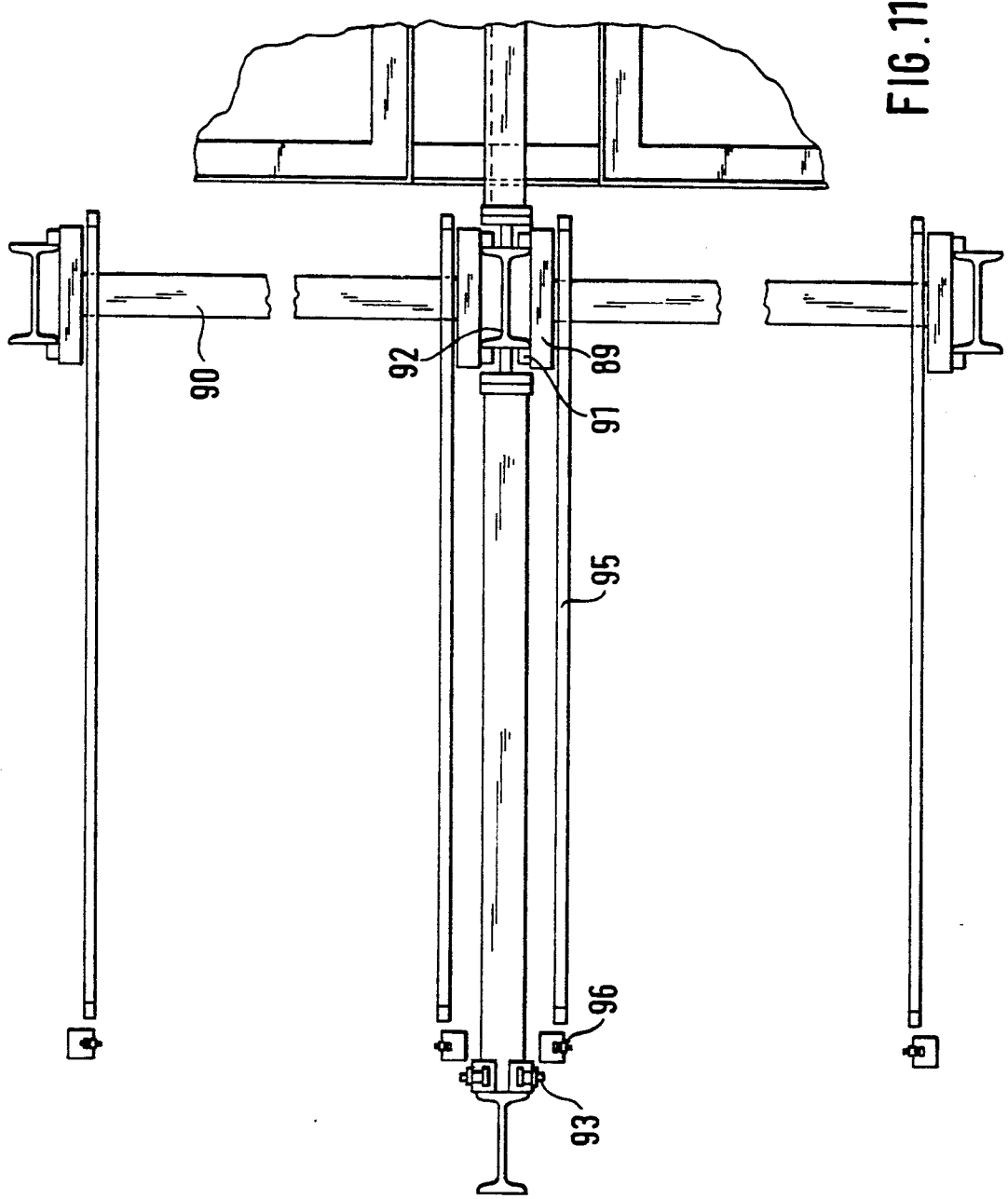
FIG. 11 is a side view of a storage structure of FIG. 10.

The lift system 86 is best seen in FIGS. 10 and 11. Two guide elements 89, for example in essentially coupled sleeve form, are connected together by a carrier element 90 (FIG. 10). The guide elements 89 are vertically movable on a vertical post or carrier 92, running thereon on rollers 91. The guide element 89 is supported on continuous, looped chains 93 (FIG. 8). Drive structures, such as motors 94, move the chains to move the transport unit 86 up and down. Projecting arms 95, operable in a suitable guide structure, such as sleeves or suspension structures similar to file drawers, but much stronger, are coupled to an endless chain 96. It is also possible to move arms 95, with drive 94 being stopped, via a separate drive 97 (FIG. 8) so that they reciprocate back and forth, for example into the position 95' (FIG. 10).

The arrangement readily permits drive for the system 86 to be externally controlled or remotely controlled, without requiring contact lines or buses or contact rails with slide connection. The arms 95 grip cassettes 56 or 79, respectively, on projecting rails or corners 98 (FIG. 4) and lift them up from a support position. The rails 98 project slightly from the cassettes, as best seen in FIG. 4.

A storage region 99 is located at the lower portion of the structure shown in FIG. 8. The storage region 99 permits products in cassettes 100 and 101 (see FIG. 9), each retaining zig-zag structures 102, 103, to be merged. Printed products can be removed from such superposed storage structures, retained in the cassettes, so that printed products from one storage structure, for example structure 102 at an upper level, can be introduced in the structure 103, at the lower level. Details of such transfer are shown and described in the referenced Patent Petersen, based on application Ser. No. 07/137,343, filed Dec. 23, 1987 now U.S. Pat. No. 4,871,159.

Figure 12:
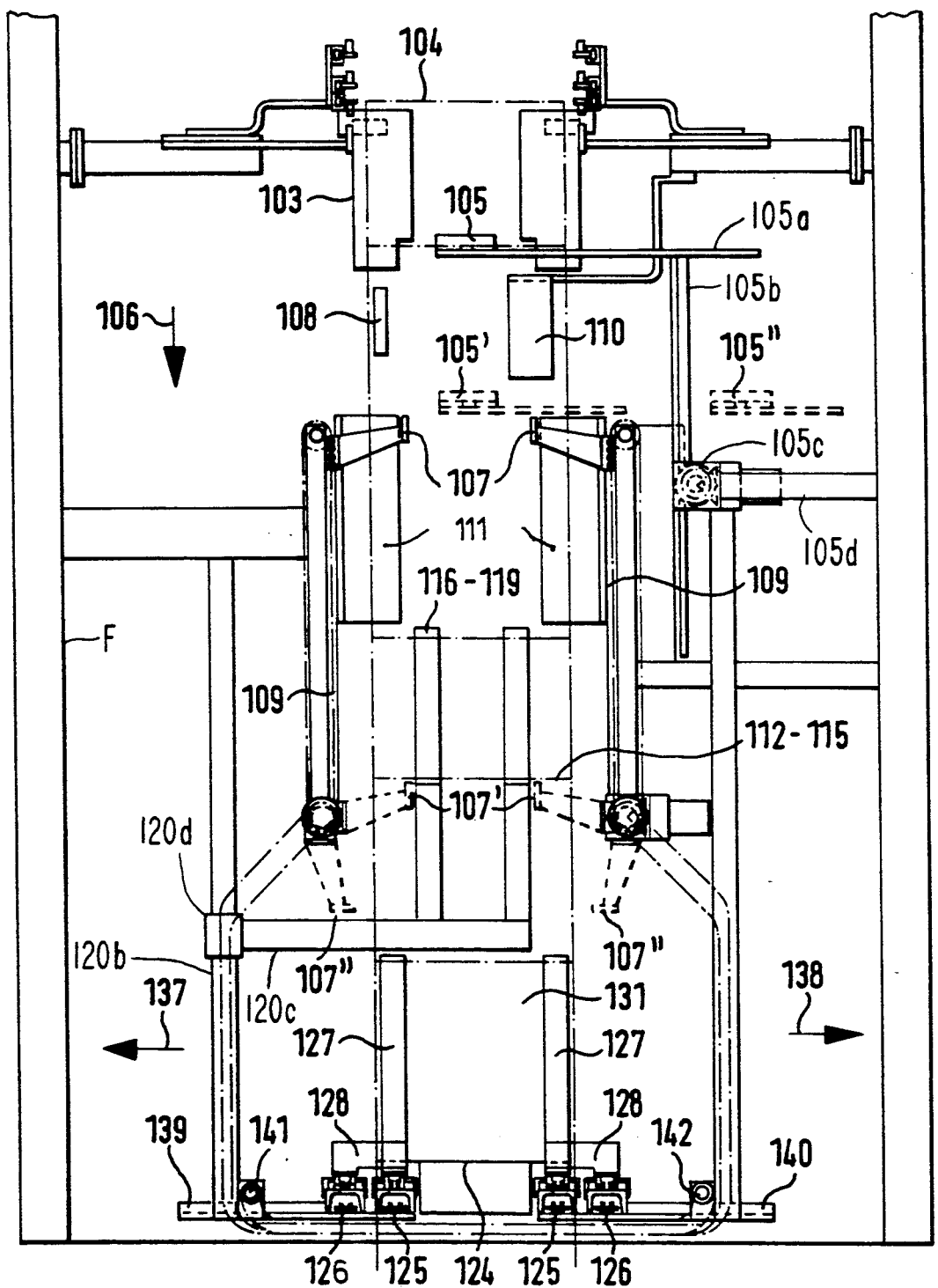
FIG. 12 is an enlarged front view of a paper handling apparatus coupled to the storage structure of FIG. 8.
Figure 13:
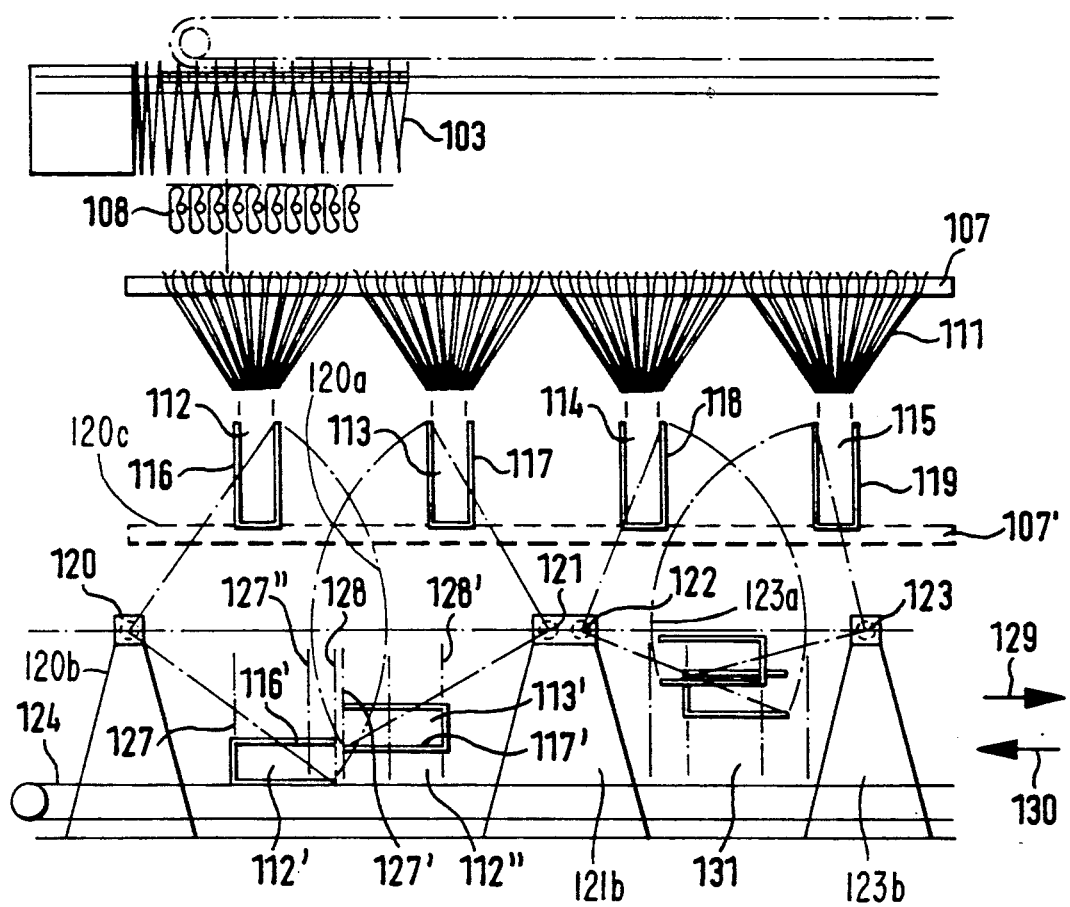
FIG. 13 is a detailed view of the paper handling structure of FIG. 12, for assembling groups of printed products and stacking them.

Further processing of printed products, so that the printed products are supplied in groups, for subsequent stacking, bundling or wrapping and transport; can be carried out in the region 99. FIGS. 12 and 13 illustrate in greater detail and to a larger scale the region 99.

FIG. 12, schematically, shows a frame F, to which various elements are secured in accordance with any well known structural engineering arrangement. The referenced Petersen U.S. Pat. No. 4,871,159 illustrates in detail a storage structure or cassette having a plurality of accordion-pleated elements which can be expanded, or pushed together, respectively. When pushed together, a substantial number of folded products can be stored in the carriers in minimum space. The carrier structures have two separate elements 102, 103 (FIGS. 8, 12, 13), one at the right side and one at the left side. The structures 102, 103 for the carriers are identical.

The carrier structures 102, 103 retain products in the lower carrier structure 103 and products in the upper carrier structure 102.

The carriers 102, 103 are spread apart to be spaced by defined distances by drive chains for the upper carrier structures. A selected number of carrier structures 102, 103 can be pulled out from the cassettes. These may be all or a portion of the carrier structures in a storage cassette.

In accordance with a feature of the present invention, a gripper system 105 is used, which will now be described in detail. The gripper system includes holding arms 105a which are secured to longitudinal guides 105b and which can be introduced from the side into the carrier structure 104. The longitudinal guides 105b are secured to carrier arms 105c (FIG. 12) which, in turn, can be shifted in longitudinal guides 105d.

Printed products 104, for example assembled together already of a plurality of products, are gripped by a gripper strip 105 which is supported for both vertical and lateral movement from frame F, in accordance with any suitable arrangement, for example by bar 105a, support rot 105b and drive 105c for rod 105b and moved, in the direction of the arrow 106 (FIG. 12), from the zig-zag storage structures, which can be spread apart, to permit release of the printed products. The gripper strip 105 first moves the printed products downwardly, the gripper strip moving to the position 105' (FIG. 12). The gripper strip 105 has gripper elements which are formed by holder elements against which holding arms can be placed to grip the products therebetween. Short relative movement of the arms will press the folded products against the holder elements or holder structures. As the printed products are moved downwardly, they pass along a guide plate 110 to support the printed product and also pass along an addressing apparatus 108 (See also FIG. 13), which applies an address code to the printed products, for example characterizing a specific distribution or delivery address of the product passing downwardly by the gripper strip 105. The gripper strip 105, upon downward movement, deposits the printed products on movable rails 107 see FIG. 12. The lateral withdrawal by the gripper strip 105 then is withdrawn laterally. Vertical movement of the gripper strip 105 is controlled by the drive 105c; the gripper strip 105 can withdraw laterally by moving the gripper strip 105 on the bar 105a and rod 105b on guide 105d, shown foreshortened in FIG. 12 for simplicity of representation, by a suitable drive source, not shown. The gripper strip 105 is withdrawn laterally into the position 105". Upon or after withdrawal of the gripper strip 105, the rails 107, which are suspended on chains 109, together with the printed products 104 located thereon, are moved downwardly in the direction of the arrow 106. The printed products, in this downward movement, are guided by the addressing apparatus 108 as well as by the support plate 110. Tongues 111, best seen in FIG. 13, collect ten copies each of the printed products to form groups 112, 1 3, 114, 115. The groups of printed products are then received in fork-shaped holders 116, 117, 118, 119 which are supported on a bar 120c.

The rails 107 then move towards the position shown in broken lines at 107' and then away to position 107", as shown in chain-dotted lines. They are now clear of the printed products. The groups of products 112-115 in the holders 116-119 can be pivoted about pivots or pivot axes 120, 121, 122, 123 (FIG. 13). The pivots on which the holder 116-119 can rotate are pivot joints 120d (FIG. 12) vertically movably supported as shown in FIG. 13 at 120b, 121b, 123b on element 120b; FIG. 12 is a view rotated 90° with respect to FIG. 13, where only the first element 120b is visible. As can be clearly seen from FIG. 12, the element 120b is coupled to the frame F. This coupling has been omitted from FIG. 13 for clarity of representation. Arcs 120a and 123a show and identify the movement of the holders 116-119, which movement can be effected by any suitable element attached to the frame F, as well known.

The printed products are not pivoted simultaneously but, rather, two adjacent products are pivoted sequentially and towards each other, to be then removed by a removal or delivery apparatus in form of a delivery belt 124.

Referring specifically to FIG. 13: The group 112 in the forked holder 116 is pivoted about pivot 120 along arc 120a in the position 112', and deposited on the belt 124. Chains 125 and 126 (FIG. 12) running parallel to the belt 124 have vertical projections or tongues 127, 128 secured thereto. The tongues 127 are secured to the chains 125; the tongues 128 are secured to the chains 126. The tongues, now, are operated by the respective chains in this manner: Tongues 127, 128 engage from respective sides against the group 112', by operation, respectively, in accordance with the arrows 129, 130, against each other. The chains 125, 126, with the tongues thereon, then operate in the direction of the arrow 129, together with the belt 124. In this operation, they pull the group 112' out of the fork 116, now in position 116, (FIG. 13) and into the position at 112". The group 113 in the forked holder 117 is then tilted about the tilt axis 121 in an arc similar to arc 123a until the holder 117 has reached the position 117', which places the group 113 in the position 113'. If the printed products were all aligned with the same edge in the holder 103 (FIG. 13), it is seen that, now, the groups 112 and 113 are placed above each other with the respective edge, which may be termed a reference edge, at opposite sides of the stack, so that the respective groups are cross-positioned. The reference edge may, for example, be the folded edge of the products, or the open sides opposite the folded edge.

Tongues 127 move for a short period from the position 127' to the position 27" (FIG. 13). By subsequent movement of the tongues 27, 128, together, as well as movement of the transport belt 124 in the direction of the arrow 130, the group 113, now in the position 113', is removed from the forked holder 117, in position 117', by being pulled outwardly. This cross-positioning can be carried out, downstream, for further groups 114, 115 so that, after cross-positioning the stacks or groups 114, 115, and upon movement of the stack or group 115 in holder 119, along arc 123a a complete package 131 of, for example, forty printed products or printed product assemblies is obtained.

Cross-positioning and stacking of each fourth group can be carried out simultaneously; in accordance with the embodiment of FIG. 9, six simultaneous cross-positioning operations can be carried out for twenty-four groups. This results in high operating and packaging and cross-positioning speed.

In accordance with a preferred embodiment of FIG. 9, six stacks 131 to 136 are obtained at the same time. They can be immediately bundled or wrapped or strapped, by apparatus well known in the paper handling fields, before the tongues 127, 128, together with chains 25, 126, are moved away laterally in the direction of the arrows 137, 138, in order to release the now preferably wrapped, bundled or strapped stacks 131-136, as shown, for example, in FIG. 12. The chains 125, 126 are preferably coupled to racks 139, 140 which are moved in the respective directions by the drive elements 141, 142.

The strapped stacks can be transported away in the direction of the arrow 129 (FIG. 13), for example, and preferably, to be directly supplied to a delivery vehicle for distribution of the printed products.

Figure 14:
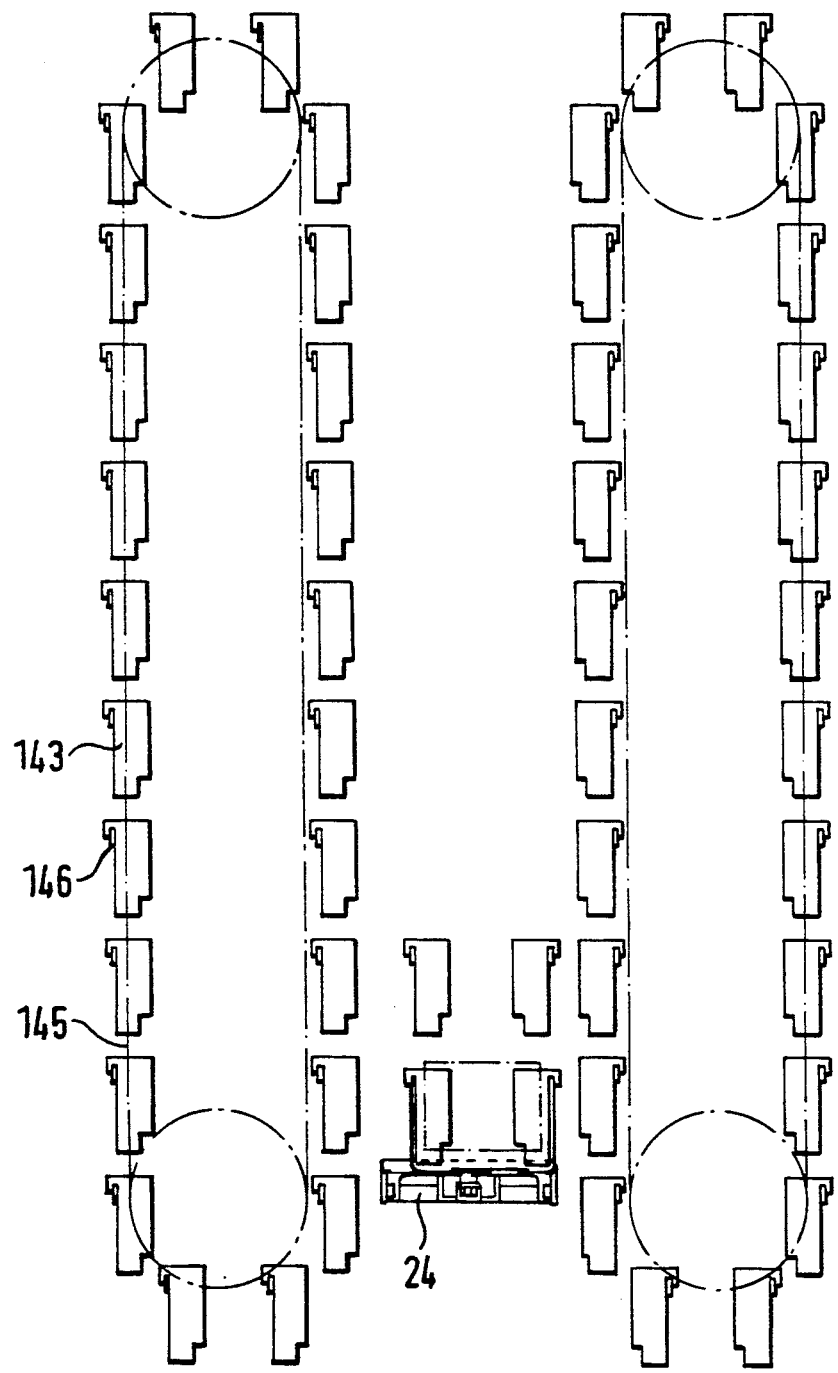
FIG. 14 illustrates a system to store zig-zag printed product carrier structures.

In accordance with a preferred feature of the invention, the storage cassettes can be completely utilized even if the printed products are of different thickness, which may be the case if certain subscribers wish to have a plurality of inserts to a daily newspaper, whereas other subscribers wish to receive only portions thereof. To permit storage at maximum density, it is necessary to adapt the length of the storage structure to the quantity of products to be stored in the respective cassettes. The storage structures 143 (FIG. 14) are designed to have a predetermined base length, for example to receive one hundred products each. FIG. 9 illustrates an endless continuous circulating lift system 144, also known as a paternoster system, coupled to one of the storage columns. The recirculating continuous lift or elevator system 144 includes endless circulating chains 145 (FIG. 14) on which cross rails 146 are located. This endless system permits separate or additional or special storage of storage structures 143.

The transport train carrying the empty cassettes and the empty storage structures therein are scanned as they pass the circulating lift system 144. The quantity of storage structures in the cassette is known, or can be determined by scanning codes or the numbers of the empty storage structures in any cassette. If more storage structures are required, for example because the printed products to be stored are thinner than the one previously stored, system 144 permits transfer of storage structures thereto, to increase the storage structure length per cassette; alternatively, if the printed products are thicker, storage structures can be removed to the circulating store. Any suitable gripper arrangements, gripping the storage structures and transferring them can be used, for example gripper tongues picking up a storage element 143 and placing it into a cassette.

Adjacent storage structure groups 147, 148 (FIGS. 5-18) can be coupled together by interengagement of adjacent structural elements. Some or all of the structural elements have suitably shaped sheet-metal strips 149, 150 secured thereto, for example by rivets, the strips having projecting ends 151 (see FIG. 15). The projections 151 can be raised by raising the entire storage structure and hooking the hooked form of strip 149 over an adjacent strip. Preferably, the storage structure blocks or groups 147, 148 are coupled together, as desired, right at the folding apparatus units 9..., and after removal from the cassettes, as best seen in FIG. 2.

Various changes and modifications may be made, and any features described herein may be used with any of the others, within the scope of the inventive concept.

I claim:

1. A system for receiving and stacking a plurality of printed products (104) supplied in groups (112-115) and for removing said groups by a removal apparatus (124), in stacks, formed by a predetermined plurality of groups, in which the printed products define a predetermined edge, and the printed products will be placed on the removal apparatus such that the predetermined edge of a first group is positioned opposite the predetermined edge of a corresponding second group, so that the groups will be cross-stacked, said system comprising means (105, 107) for temporarily gripping the groups of printed products;

means (105a, 105b) for vertically moving said gripping means and hence said printed products and for moving said groups of printed products in a vertical direction;

a plurality of holder fork means (116-119) located beneath a lower position of said gripping means (105, 107) and said moving means (105a, 105b) and located for receiving each group of products and retaining said products of said product groups within said holder fork means, with said predetermined edge at a predetermined position in said holder fork means, said holder fork means being pivotably secured in a frame (F) of said system, two each holder fork means being arranged in pairs, in which said holder fork means are, when in position to receive said groups of products, essentially parallel to each other, said removal apparatus being located below said holder fork means; and means (120, 120a, 121, 122, 123, 123a) for sequentially pivoting the holder fork means of respective pairs (116, 117, 118, 119) towards each other and for placing, sequentially, said groups of said pairs of products above each other on the removal apparatus (124), whereby the printed products will be placed on the removal apparatus (124) in which said predetermined edge of a first placed product group is positioned opposite the predetermined edge of the corresponding second sequentially placed product group and, thereby the product groups on said removal apparatus will be cross-stacked.

2. The system of claim 1, wherein said product removal means includes a transport belt (124).

3. The system of claim 1, wherein said removal apparatus comprises a transport belt (124); and cable or chain means (125, 126) positioned parallel to said belt (124) and projecting tongues (127, 128) located on said cable or chain means, said tongues being positioned for engagement with the groups (112, 113) of printed products upon pivoting of the holder fork means (116-119), for moving the groups of printed products (112, 113) in superposed position out of the holder fork means and for transport by the transport belt (124).

4. The system of claim 1, wherein at least four parallel holder fork means are provided, each supplied with printed products;

and wherein, after placement of two first groups of printed products (112, 113) on the delivery apparatus, the delivery apparatus moves the said two first groups in alignment with two further holder fork means (118, 119) for placement of two further cross-positioned groups of printed products (114, 115) on top of the first positioned groups (112, 113).

5. The system of claim 1 wherein said means (105, 107) for temporarily gripping the groups of printed products comprises movable gripping means (105) for temporarily gripping the printed products at said predetermined edge, and from below;

vertically movable holder rails (107) movable between an upper position for receiving the gripped products, and a lower position, said gripper means (105) being withdrawn laterally for transfer of printed products from the gripper means to said holder rails (107) upon lateral withdrawal of said gripper means;

means (109) for vertically moving the holder rails (107) between said upper and lower position; and wherein said plurality of parallel positioned holder fork means are located beneath said lower position of the holder rails.

6. The system of claim 5, wherein said moving means additionally move said holder rails outwardly with respect to said printed products into an outwardly deflected position (107") for clearing said printed products for placement in said holder fork means (116, 119).

* * * * *